(No Model.) 2 Sheets—Sheet 1.

R. L. MITCHELL.
SHAFT.

No. 440,121. Patented Nov. 4, 1890.

Witnesses:—

Inventor:—
Robert L. Mitchell,
By his Attorney.

(No Model.) 2 Sheets—Sheet 2.
R. L. MITCHELL.
SHAFT.

No. 440,121. Patented Nov. 4, 1890.

Witnesses:

Inventor:
Robert L. Mitchell
by C D Moody
his atty

UNITED STATES PATENT OFFICE.

ROBERT L. MITCHELL, OF BOONEVILLE, ASSIGNOR OF ONE-EIGHTH TO CATHARINE A. WILLIAMSON, OF ST. LOUIS, MISSOURI.

SHAFT.

SPECIFICATION forming part of Letters Patent No. 440,121, dated November 4, 1890.

Application filed December 3, 1889. Serial No. 332,420. (No model.)

*To all whom it may concern:*

Be it known that I, ROBERT L. MITCHELL, of Booneville, Missouri, have made a new and useful Improvement in Shafts for Propellers and Paddle-Wheels and other Structures, of which the following is a full, clear, and exact description.

In place of making a shaft of the kind under consideration of a single thickness, solid or tubular, as heretofore has been customary, I construct it mainly of a series of tubes shrunk successively onto each other, or in an equivalent manner built up and secured together, substantially as herein described and claimed, aided by the annexed drawings, forming part of this specification.

Figure 1:
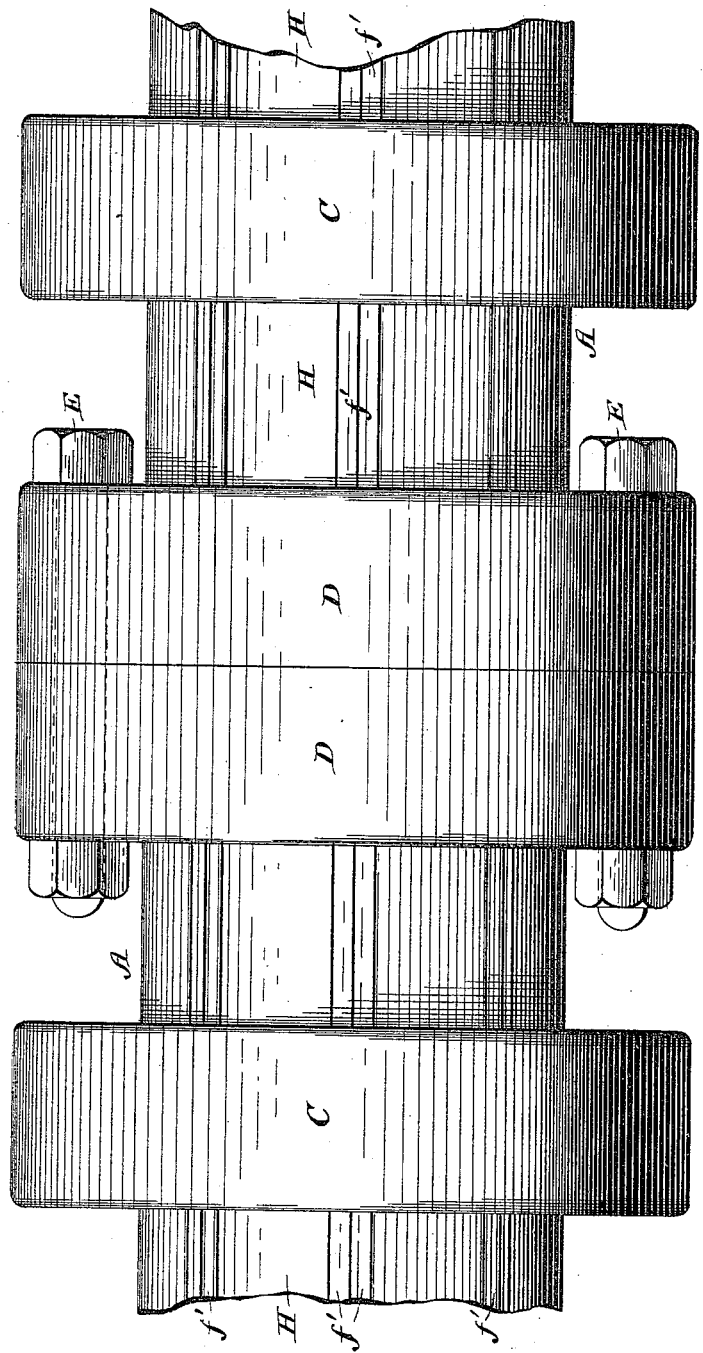
Figure 2:
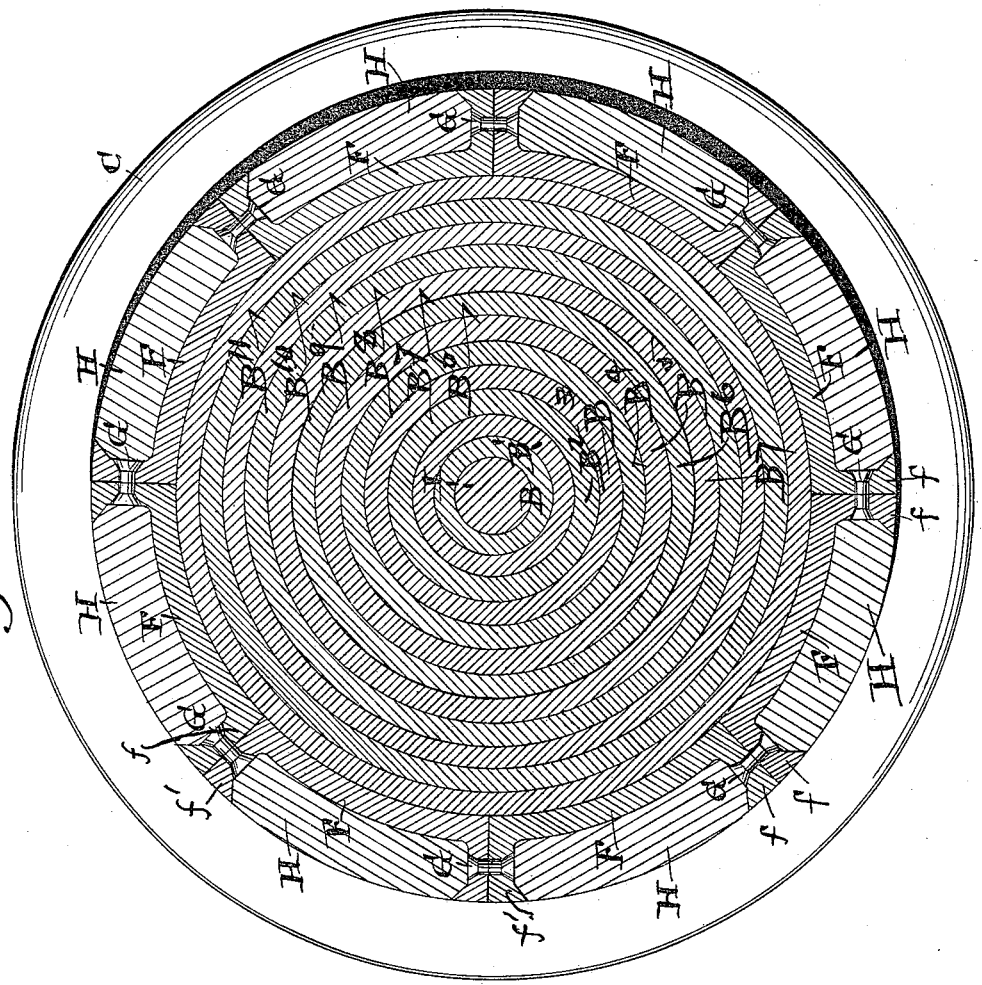

Figure 1 represents a side view of a propeller-shaft embodying the invention, and Fig. 2 a cross-section of the shaft.

Shafts constructed in the ordinary way are liable to contain flaws which are impossible to detect from the outside, and when a flaw exists it is very liable to extend and develop into a break when the shaft is subjected to a severe strain. To provide a method of constructing shafts which obviates this danger and which secures to shafts more strength to resist strains, and especially twisting strains, than can be obtained by the usual modes of construction, is the object of this improvement.

In shafts constructed by this improved method the metal thereof is to a great extent exposed to view in the course of said construction, whereby opportunity is given for the detection of flaws, and the danger incident to the ordinary modes of construction of the existence of hidden flaws in the shaft largely diminished, and in case a flaw does exist in one of the tubes forming an improved shaft and the shaft is subjected to a strain sufficient to produce an extension of the flaw it will not be liable to extend beyond the metal of the tube in which the flaw originated, whereas in the ordinary construction under similar circumstances the flaw would be liable to extend until a broken shaft was the result. In the usual construction the continuance of the grain or fiber of the metal of the shaft favors the extension of a flaw in the metal, whereas in the improved construction a contrary effect is produced by the discontinuance of the grain.

A shaft of the improved construction has greater strength than one of equal weight of ordinary construction.

A represents the improved shaft. In its simplest form it is composed of series of the tubes B B' B², &c. Bands C C may tightly encircle and bind the improved shaft. Flanges D D may be formed around sections of the shaft at the ends thereof to enable the sections to be united endwise by means of the bolts E, as shown.

F F F, Fig. 2, are flanged segments forming the outer tube. They are united laterally by means of bolts or rivets G, Fig. 2, passing through the flanges $f$ of the segments F. Staves H, Fig. 2, are arranged upon the outside of the segments F F and confined between the flanges $f$, completing the outer tube. Bands such as C, Fig. 2, secure in place the staves H.

In Fig. 2, I is the core of the solid form of the improved shaft, for in the construction of shafts in the manner hereinbefore described the "building up" thereof need not necessarily begin with a tube. A solid bar may be substituted in place of an initial tube and the building on said rod proceeded with as if a tube was used for the initial. In this case the shaft would of course be solid throughout instead of tubular.

Steel is the preferable material whereof to construct the herein-described structures; but any other suitable material may be employed for that purpose. The tubes B B' B², &c., at the ends thereof are preferably welded together. This is not shown. The flanges $f$ have at their outer edges the shoulders $f'$, Fig. 2, between which the staves H can be inserted and held in place.

I claim—

1. The herein-described shaft, formed of a series of tubes successively tightly fitted onto each other and having the flanged segments, staves, and bolts applied to said series, substantially as described.

2. The herein-described shaft, formed of a series of tubes successively tightly fitted onto each other and having the flanged segments, staves, bolts, and bands applied to said series, substantially as described.

3. The herein-described shaft, comprising a series of tubes successively fitted tightly upon each other, the outer tubes being composed of longitudinal sections or segments F, provided with outstanding edge flanges $f$, the longitudinal staves H, fitted between said flanges, and the circumferential rings surrounding the shaft, substantially as specified.

4. The herein-described shaft, comprising a central solid core, a series of tubes successively tightly fitted upon said core and upon each other, the outer tube being composed of longitudinal sections or segments F, provided with outstanding edge flanges $f$, having the shoulders $f'$ on their edges, the bolts G, connecting adjoining flanges, and the staves fitted and held between the flanges of each section, substantially as specified.

Witness my hand this 6th day of November, 1889.

ROBERT L. MITCHELL.

Witnesses:
C. D. MOODY,
D. W. C. SANFORD.